United States Patent [19]

Nichols

[11] Patent Number: 4,998,273
[45] Date of Patent: Mar. 5, 1991

[54] TELEPHONE LINE CALLED NUMBER RECOGNIZER

[75] Inventor: Robert H. Nichols, Darnestown, Md.

[73] Assignee: James C. Wray, McLean, Va.

[21] Appl. No.: 369,945

[22] Filed: Jun. 22, 1989

[51] Int. Cl.⁵ .................. H04M 11/00; H04M 3/42
[52] U.S. Cl. .................................. 379/102; 379/180; 379/201; 379/373
[58] Field of Search ............... 379/179, 180, 373, 372, 379/102, 104, 105, 201, 375, 377, 380, 106, 107

[56] References Cited

U.S. PATENT DOCUMENTS

| | | | |
|---|---|---|---|
| 4,146,754 | 3/1979 | Rose | 379/179 |
| 4,701,949 | 10/1987 | Lynch et al. | 379/179 |
| 4,782,518 | 11/1988 | Mattley et al. | 379/201 |
| 4,821,312 | 4/1989 | Horton et al. | 379/102 |

FOREIGN PATENT DOCUMENTS

| | | | |
|---|---|---|---|
| 1594931 | 8/1981 | United Kingdom | 379/102 |
| 2193419 | 2/1988 | United Kingdom | 379/374 |

Primary Examiner—Jin F. Ng
Assistant Examiner—Wing F. Chang
Attorney, Agent, or Firm—James Creighton Wray

[57] ABSTRACT

A party-like telephone line with plural numbers having distinguishable ringing signals on a single line is automatically connected to a facsimile or other telephone connected device for receiving incoming messages upon sensing a predetermined ring sequence with an interface, counter, timers, and comparator.

6 Claims, 4 Drawing Sheets

TELEPHONE LINE CALLED NUMBER RECOGNIZER

BACKGROUND OF THE INVENTION

This invention is related to telephone line usage and subscriber cost reductions At the time of the present invention, fax, telecopier or telefacsimile machines have become popular. Their popularity and sales and competition in their manufacture have reduced retail cost of the machines to about $800.00. Business telephone lines are billed at about $20.00 a month. Over the life of a fax machine, basic telephone line availability charges exceed the cost of the fax machine "Fax", "telefax", "facsimile" and "telecopier" are used interchangeably.

At the time of this invention local telephone companies have begun offering add-on features to existing or new lines which allow the subscriber, in the words of the telephone company, to determine whom a call is from or for before answering the telephone. The service, called IdentaRing by Bell Operating Companies, but may be called other things by other telephone companies, is much like an individual party line service In the present implementation, up to three numbers are assigned to one line. When a caller calls the first number a long ringing signal is made. When a party calls the second number, a short, short ringing signal is made. A call of the third number produces a short, long, short ringing signal. Different patterns may be used with expanded services or in other areas. In fact, the new IdentaRing service operates much as an individual inbound party line. Out calls are all made on a single number. Further information about the service is currently available by calling 1-800-678-RING or asking a local office for an IdentaRing brochure.

U.S. Pat. No. 4,146,754 uses the timing of ringing signals to select different devices or telephones. This requires two separate telephone calls That disclosure would not be operative with the IdentaRing service. The elements are used in a distinct way.

Apparatus for selectively alerting party line subscribers has been described in U.S. Pat. No. 4,723,271, which relies on changing the nature of the ringing signal and identifying the different nature of the signals That patent involves voltage and polarity as opposed to timing, and would require special hardware at the central office.

Local telephone companies in urban areas avoid use of the "party line" concept and have been discontinuing existing party line service. In fact, many historic party line subscribers have individual lines, other parties on the lines having been converted to individual service.

A problem exists for telephone subscribers in how to obtain maximum use of telephone lines and minimize office overhead and communication expenses. This invention proposes one solution to the continuing problems.

SUMMARY OF THE INVENTION

The present invention is directed to reducing office communication expenses. It is equally applicable to private communication expenses. Briefly, the invention uses a newly available telephone service feature to reduce the costs of operating machines coupled to the telephone lines. Historically, such machines, such as computer modems and particularly fax machines, have required dedicated lines to receive incoming messages. A calling fax machine dials a dedicated number for a called fax machine which, upon detecting a ringing signal, turns on the fax receiver and transmits a tone indicating that the called machine is ready to receive. The calling fax is programmed for dialing a number and waiting for the answering tone before proceeding with the message.

The new invention adds one further step. The called fax machine contains a circuit which is switched on by the beginning of a ringing signal and counts or senses timing sequence of the ringing signal or breaks therein to determine whether the telephone number associated with the fax machine is being called. A normal ringing signal lasts about two seconds and pauses for four seconds before repeating on six second cycles. The second called number ring sequence usually consists of two short rings occupying about two seconds, and the third called number short-long-short signals span about three seconds. Patterns are repeated on approximately six second cycles. Times of ringing signals and cycles may vary.

Other devices or persons wishing to be called on the same line are assigned other numbers on that line that they will answer when they detect their particular ringing sequence.

In effect, the present invention provides to the outside world what appears to be dedicated fax line, and what operates exactly as a dedicated fax line, at a cost to the subscriber of a fraction of a dedicated line.

While the invention is described specifically with reference to fax machines, because of the urgent need at this time, the invention works with any equipment connected to a telephone line for any purpose. As a single example, a person may use IdentaRing inbound numbers to call selectively a fax, a modem or an answering machine, all on the same telephone line. Other devices which may be connected to the line are, for example, answering machines, telephone stations, voice message machines, security systems, or any other devices normally connected to a telephone line.

The present system may operate as a ring filter for a single device or a multiple device ring switch.

Line interface connections to telephone lines may be direct, magnetic or acoustic.

The present invention can be implemented as hardware or software, or a combination of both.

In use with IdentaRing services, the differentiation circuitry of the present invention can determine a specific called number by counting rings within a predetermined time period. In other implementations of this type of service by the telephone companies, it may be necessary to look at the timing of length and length between these signals.

The prior art requires a separate telephone line for each device or explicit signalling after a call is answered. Putting all devices together on one line adds confusion and conflict. Alternately, existing fax switches answer the telephone and wait for a fax tone (signal). In that technology, if the call is long-distance voice (i.e. not for the fax) and the person being called is not in, the circuit will still be connected and the calling party will be charged for the call. In addition, not all fax devices emit this tone, so these switches do not work in all cases and they do not work with other devices such as modems or voice message systems in which the calling device does not emit an identifying tone.

This new invention keeps devices separate without conflict and does not answer the telephone if the called device or selection is not available. Because it does not rely on characteristics of the calling device, it is also totally reliable in the detection of calls for a particular number.

The purpose of this invention is to provide a switching or differentiated function based on the ringing sequence of a telephone line for those lines which are either party lines or otherwise have multiple numbers assigned.

The called number recognizer is connected to the telephone line and senses the ringing signals. It uses the characteristics of the particular signal (typically count or timing is the differentiating characteristic) which can then be used to provide a control for some other process, such as answering the line or routing the signal based on the number being called.

The device of this invention is incorporated internally in or externally with fax machines, modems, answering machines and other machines to be used to identify a call to that device as secondary to the main use of the line. The system is also used to provide other control functions such as power up or reset of a computer or other pieces of equipment, or to route ringing signals to one of several destinations.

A preferred telephone line called number recognizer apparatus includes a single telephone line having plural numbers associated with that line, each number being assigned a special ring sequence, such as long, short-short, or short-long-short, substantially giving a party line condition to an existing single line. A sequence determining circuit differentiates the ring sequence and a control signal connects special equipment to the line or activates an external function.

One sequence determining circuit includes a line interface to detect ringing signals and convert to standard logic level, a counter or storage device to count rings in a cycle, a first timer to determine when ringing has stopped on a particular call, and a second timer to determine when ringing has stopped in a particular cycle.

In a preferred embodiment, the sequence determining circuit is internal to a fax machine or other device. This sequence determining circuit is connected to the device's telephone line. A counter or storage device is used to count rings, with the timers used to determine ring cycling. When the appropriate sequence is detected, the control signal directs the fax machine to answer the telephone call in the standard manner. If the appropriate sequence is not detected, the call will not be answered. This sequence determining circuit may be implemented as additional hardware or as a modification of the existing control process of the device.

In a second embodiment, the sequence determining circuit is external to the device. This sequence determining circuit is connected to a telephone line and to a switching circuit which switches the line to one or more outputs depending on the ringing sequence being presented. The outputs are then connected to standard telephone line devices such as fax machines, modems, and answering machines which do not have the apparatus incorporated internally.

In a third embodiment, the sequence determining circuit is connected to a telephone line and to a switching circuit which will control one or more electrical (i.e. non-telephone oriented) devices depending on the ringing sequence being presented.

The circuit comprises the sensor and connecting means, wherein the sensor and the connecting means are in a control unit which is connected through an input jack to a telephone line and the connecting means comprises a switch, and further comprising a house current input connected to the switch and an outlet connected to the switch for controlling the supply of electrical power according to the ring tones sensed by the sensing means.

These and other and further objects and features of the invention are apparent in the disclosure, which includes the above and ongoing specification, with the claims, and the drawings.

DETAILED DESCRIPTION OF THE DRAWINGS

Figure 1:
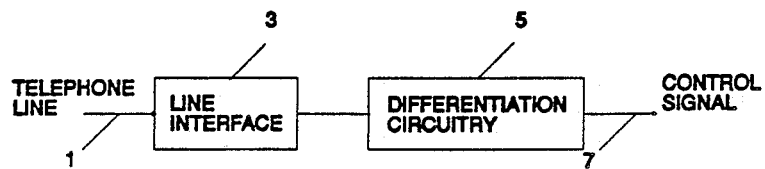
FIG. 1 is a schematic representation of the present invention.
Figure 2:
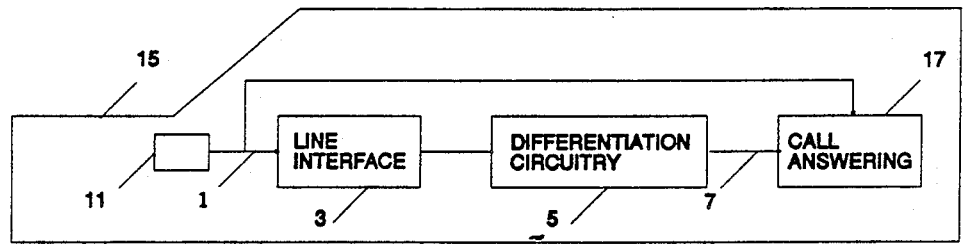
FIG. 2 is a schematic detail of one form of the invention.

Referring to FIGS. 1 and 2, a telephone line generally indicated by the numeral 1 is connected to the basic structure which includes a line interface 3, which is connected to a differentiation circuit 5 to produce a control signal 7 when a desired number or sequence of rings in a cycle indicates that a particular number has been called. Line 1 is connected by a jack 1 to a fax 15 or modem, which includes call answering equipment 7.

Figure 3:
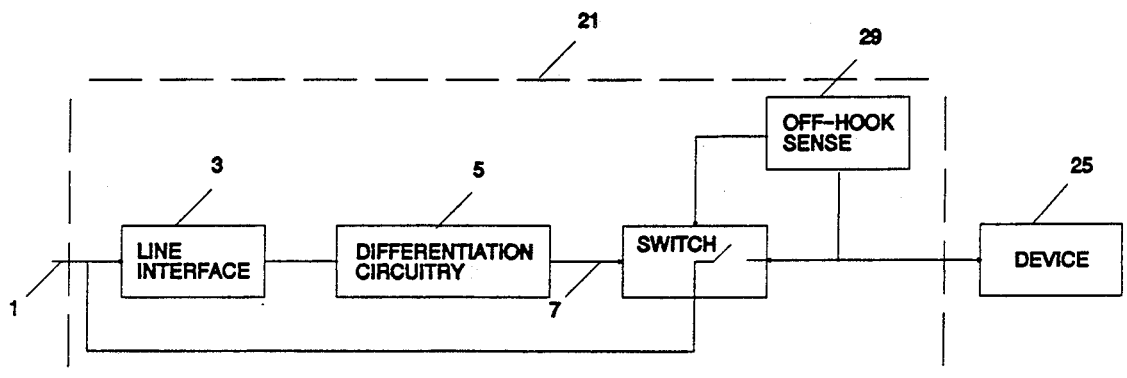
FIG. 3 is a schematic detail of a preferred form of the invention.

Referring to FIG. 3, when the present invention operates as a single device ring filter 21, the call comes into the line interface 3, where noise is filtered, and voltages are converted into appropriate logic signals to be sent to the differentiation circuitry. The differentiation circuitry 5 senses the ring sequence for the appropriate line and, when detected, emits a control signal 7 to the switch 23, which connects the line to the device 25. An off-hook sensor 29 is connected to the line 27 going to the device to sense an "off-hook" condition. Upon receiving the control signal, the switch 23 remains connected as long as the device remains off-hook. The off-hook sensor 29 is also used in the case of the device's originating a call, in which case it will also be connected to the line for the time in which the device is off-hook Switch 23 connects line 1 to device 25 on occurrence of either (1) a ringing sequence for appropriate time or (2) device 25 going off-hook. Switch 23 opens (1) after device 25 goes "on-hook" or disconnects, or (2) after ringing has stopped and device 25 has not answered.

Figure 4:
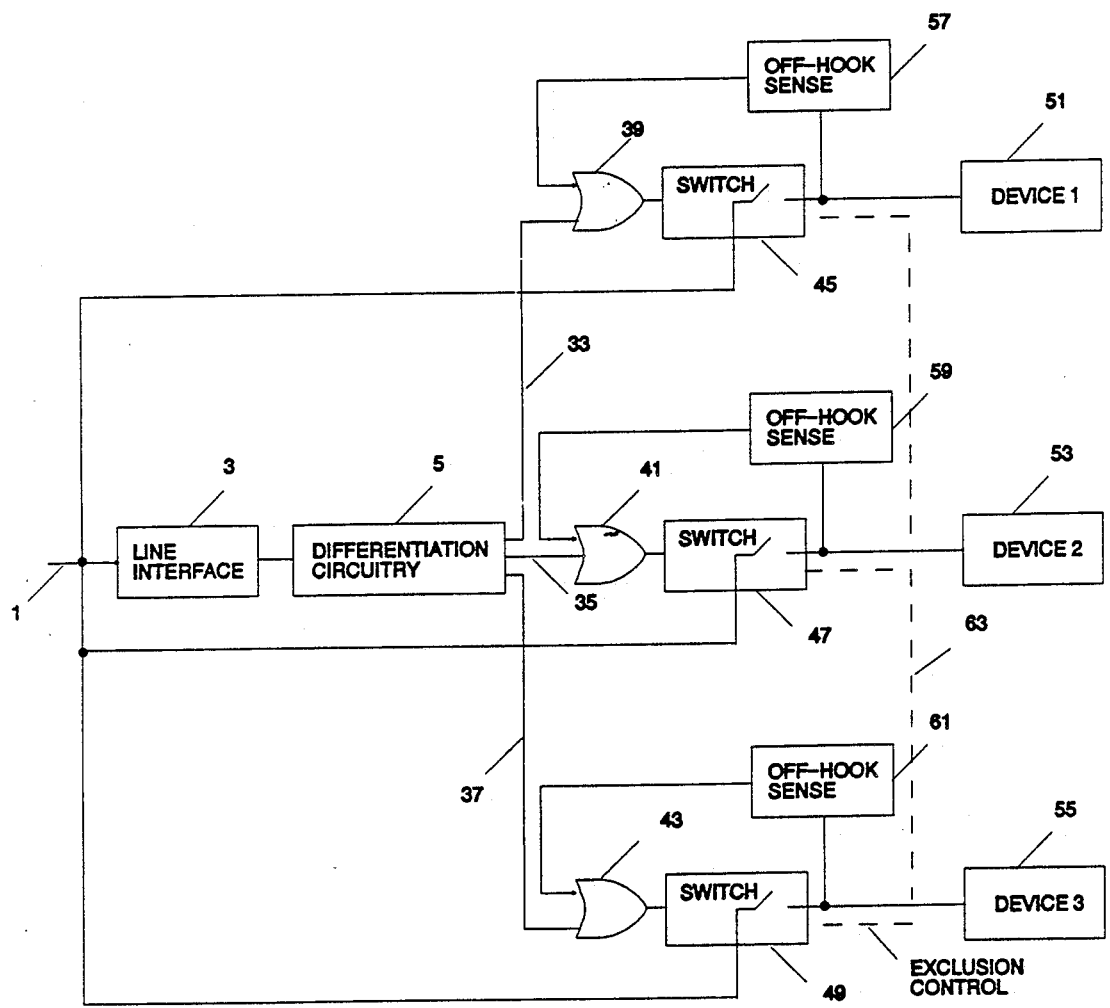
FIG. 4 is a schematic detail of one form of the invention.

As shown in FIG. 4, when the invention is used as a multiple device ring filter 31, the line 1 comes into the line interface 3 where noise is filtered and voltages are converted into appropriate logic signals to be sent to the differentiation circuitry 5. The differentiation circuitry senses the ring sequence and emits control signals 33, 35, 37 via "or" gates 39, 41, 43 to the appropriate switches 45, 47, 49. If no other switch is currently activated, the selected switch connects its device 51, 53, 55 to line 1. An off-hook sensor 57, 59, 61 is connected to a line going to each device to sense an "off-hook" condition. Upon receiving the control signal, the switch will remain connected as long as the device remains off-hook. The off-hook sensor is also used in the case of the device's originating a call, in which case it will also be connected to the line for the time in which the device is off-hook. An exclusion control 63 between the switches is used to insure that while the line is connected to a particular device then the other devices are excluded from accessing the line, even if they were to go off-hook.

The exclusion control means is respectively connected to the first, second and third switches for preventing operation of two of the switches when one of the switches operationally connects one of the units to the telephone line.

Figure 5:
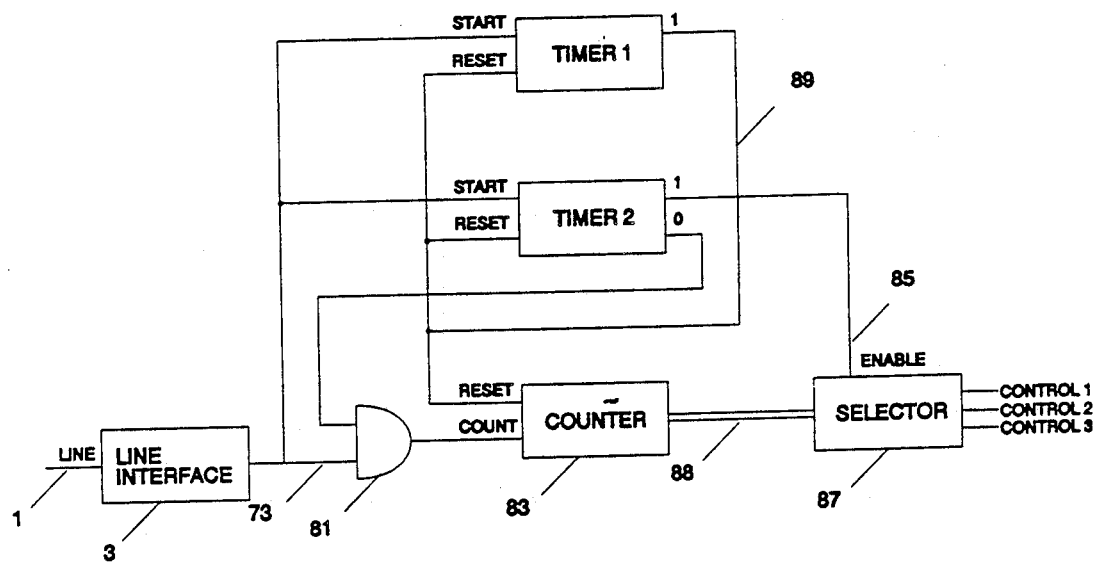
FIG. 5 is a schematic detail of a preferred form of the invention.

An example of a particular, but not the only possible, implementation of differentiation circuitry 5 is shown in FIG. 5.

Line Interface 3 interfaces to line 1, removes noise from ring signals and converts signal to a standard logic level. For the duration of a ring, the output 73 of the line interface 3 goes high.

A "ring cycle" consists of a single ring sequence and is typically about 6 seconds long. A ring sequence is that set of rings in one ring cycle which identifies a particular called number. In the case of IdentaRing, this sequence is one long ring for called number one, two short rings for called number two, and a short-long-short sequence for called number three.

The differentiation circuitry works for IdentaRing by counting the number of rings in a sequence. In other implementations of the selective called number, the differentiation circuitry may have to be sensitive to the length and pauses of the ring signals.

In the quiet condition, Timer 1 and Timer 2 are reset and counter 83 is zero. On the first ring, Timer 1 and Timer 2 are started and counter 83 is incremented to one. "And" gate 81 insures that if further ring signals occur in the sequence while the output of Timer 2 is low, counter 83 is incremented by one on each signal on line 73. When the output of Timer 2 goes high, "and" gate 81 prevents further inputs to counter 83.

Timer 2 is used to determine when one ring sequence is complete with one ring cycle. Timer 2 starts upon the first logic signal on connector 73 from interface 3 and continues to time without regard to further signals on line 73. Timer 2 is configured with a preset time greater than the typical ring sequence and slightly less than the ring cycle. Typically, it is based on a time of about 4–5 seconds. When that time expires, then the sequence is complete and the value of the counter is valid. An enable signal 85 is sent to the selector 87 which generates the appropriate control 1, 2 or 3 signal based on the value of the counter 83. Selector 87 may be a chip demultiplexer, which receives binary signals from counter 83 through lines 88, and which produces a signal control 1, 2 or 3 depending on the enable signal and whether a binary 1, 2 or 3 is present in the counter 83.

Timer 1 is used to determine that the ringing has stopped and to reset the circuitry. Timer 1 is started upon each signal on line 73. Timer 1 is configured with a preset time greater than the ring cycle of a factor of 2–3, or typically about 10–15 seconds. When the ringing has stopped, Timer 1 will expire and reset 89 the differentiation circuitry for the next call. Once started, Timer 2 continues to run. Timer 2 continues to produce an output at its zero output terminal until reaching its preset time, when it shifts to a one output.

Figure 6:
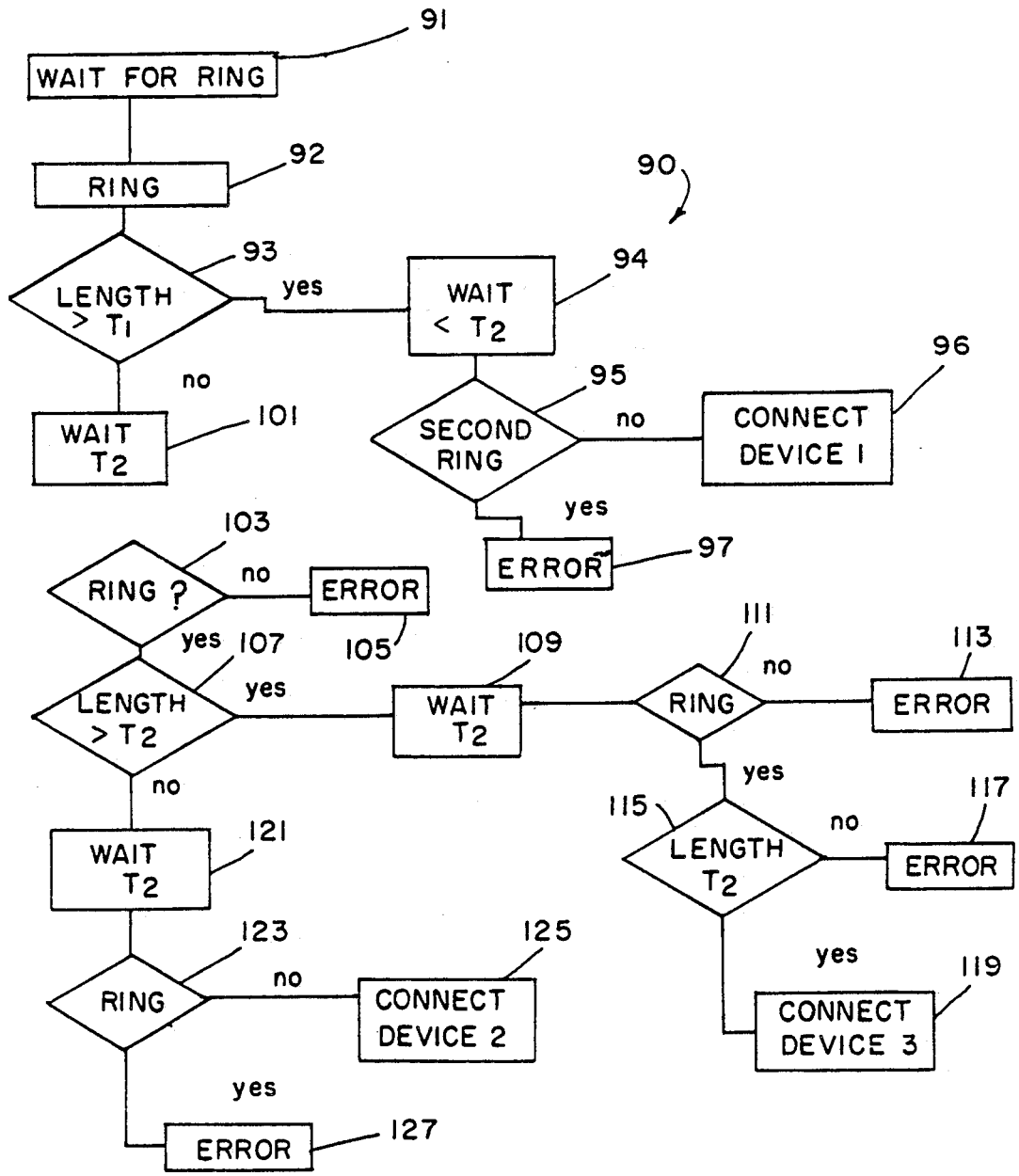
FIG. 6 is a flow chart of a system for recognizing called numbers and connecting to a telephone line.

FIG. 6 shows a flow chart of an example of a possible but no the only system for carrying out the present invention by using ring lengths and sequences to detect which number on a line is being called, or which line in a group of lines is being called. The particular example shown in FIG. 6 is especially useful in a system which uses long, short-short, and long-short-long rings to distinguish among three number called on a single line, or to distinguish among three lines.

For purposes of clarity, in FIG. 6 the called numbers are referred to as lines 1, 2 and 3.

In the system of FIG. 6, generally referred to by the numeral 90, the system first waits 91 for a ring. When a ring 92 occurs, the system compares 93 the length of the ring 92 with time T-1, which equals the time of a short ring.

If the time of ring 92 is greater than time T-1, the system waits 94 for a period which is shorter than T-2. T-2 equals the break time or the short time between rings in a ring sequence. The system decides 95 whether there is a second ring. If there is no second ring the system connects 96 the equipment on line 1. If there is a second ring, the system indicates an error 97 and resets. If in step 93 the length of ring 92 is not greater than T-1, the system waits 101 for a time T-2 and decides 103 whether there is a ring present. If there is no ring present, the system notes an error 105 and resets. If there is a ring present, the system decides in step 107 whether the ring detected in step 103 is greater than T-2. If the time of the second ring is greater than T-2, the system waits 109 for a period equal to T-2 and decides 111 whether there is a third ring. If there is no third ring, the system notes an error 113 and resets. If there is a third ring as determined by decision step 111, the system decides 115 whether the time of the third ring is equal to T-2. If it is not equal to T-2, the system notes an error 117 and resets. If the time of the ring is equal to T-2, the system connects 119 the incoming call to equipment on line 3, which is associated with the third number. If the system decides 107 that the length of the second ring is not greater than T-2, the system waits 121 for a time T-2 and decides 123 whether there is a third ring. If there is no third ring, the system connects 125 the equipment to line 2, which is associated with the second called number. If there is a third ring, the system notes an error 127 and resets the system.

The present invention is useful with all situations in which called numbers are distinguished by variations within ring sequences. Distinctions in count are preferably handled by counter based discrimination circuitry. Distinctions in length of rings may be handled by length discrimination systems such as described with reference to FIG. 6. As an example, a system which distinguishes among rings of AAA, BAB, AAB, BAA and ABA where B is a long ring and A a short ring, is best served by a length discriminating system similar to the system described in FIG. 6, with appropriate steps.

While the invention has been described with reference to specific embodiments, modifications and variations of the invention may be constructed without departing from the scope of the invention, which is described in the following claims.

I claim:

1. Telephone line called number recognition apparatus comprising a telephone line interface for connecting to a telephone line having plural telephone numbers, differentiation means connected to the telephone line interface, and a call answering means connected to the differentiation means for activating by the differentiation means and for answering a call when a particular telephone number associated with the call answering means is determined by the differentiating means, further comprising plural gates connected to the differentiation means for receiving a signal from the differentiation means according to which telephone number on the incoming telephone line has been called, plural switches respectively connected to outputs of said plural gates, and plural off-hook sensors connected to outputs of said plural switches and to the inputs of said plural gates for controlling the outputs of said plural gates and said plural switches with outputs from the differentiation means, and plural operational units respectively connected to said plural switches for respectively connecting the operational units to the telephone line through the switches upon recognition of a particular called telephone number by the differentiation means.

2. The apparatus of claim 1, wherein said plural gates comprise first, second and third gates respectively connected to first, second and third outputs of the differentiation means, and wherein said plural switches further comprise first, second and third switches respectively connected to outputs of the first, second and third gates, and wherein said operational units comprise first, second and third units respectively connected to the switches, whereby the gates control the switches for respectively connecting either the first, second or third unit to the telephone line.

3. Telephone line called number recognition apparatus comprising a telephone line interface for connecting to a telephone line having plural telephone numbers, differentiation means connected to the telephone line interface, and a call answering means connected to the differentiation means for activating by the differentiation means and for answering a call when a particular telephone number associated with the call answering means is determined by the differentiation means, wherein the differentiation comprises an AND gate having an input connected to the line interface, first and second timers having inputs respectively connected to the line interface, and a counter having an input connected to an output of said AND gate, the first timer having an output connected to reset input of each of the first and second timers and the counter respectively, a selector connected to an output of the counter, a high output of the second timer connected to enable input of the selector, and a low output of the second timer connected to an input of said AND gate.

4. The apparatus of claim 3, further comprising first, second and third control outputs from the selector for controlling first, second and third units and for respectively connecting a selected unit to the telephone line.

5. A method of recognizing called numbers on a telephone line, comprising connecting an interface to a line, detecting a ring signal on the line with the interface, and converting the ring signal to an information signal at the output of the interface, differentiating information signals from the interface and determining which number is being called, connecting an operational device to the telephone line upon the recognizing by the step of differentiating of a ring signal associated with said called number wherein the step differentiating comprises starting first and second timers upon occurrence of a ring signal and incrementing a counter by one, incrementing the counter by one upon each occurrence of a ring signal, stopping the second timer at a time which is less than a ring cycle, stopping the first timer at a time which is greater than the ring cycle, controlling a selector for selecting a unit with the output of the counter, enabling the selecting with an output of the second timer, and connecting an operational unit to the telephone line with the selector, and resetting the first and second timers and the counter with an output of the first timer.

6. A method of recognizing called numbers on a telephone line, comprising connecting an interface, and converting the ring signal to an information signal at the output of the interface, differentiating information signals from the interface and determining which number is being called, connecting an operational device to the telephone line upon the recognizing by the step of differentiating of a ring signal associated with said called number, wherein the step of differentiating comprises waiting for a ring, sensing a ring, determining whether the length of a ring is greater than a predetermined first time T-1; if the length of the ring is greater than the predetermined first time, waiting for a time which is less than a predetermined second time T-2, determining whether there is a ring after the second waiting; if there is no ring, enabling a connection of a unit associated with a first number to the telephone line; if there is a ring after the second waiting, noting an error and resetting the system; if the deciding whether the length of the first ring is greater than T-1 results in a negative, waiting the time T-2 for a second ring; if there is no second ring, noting an error and resetting the system; if there is a second ring, determining whether the length of the second ring is greater than T-2; if the length of the second ring is not greater than T-1, waiting for T-2 and deciding whether there is a third ring; if there is no third ring, enabling equipment associated with the second called number to be connected to the telephone line; if there is a third ring, noting an error and resetting the system; if the length of the second ring is greater than T-2, waiting for a time T-2 and deciding whether there is a third ring; if there is no ring, noting an error; if there is a ring, deciding whether the third ring equals T-2; if the third ring does equal T-2, enabling the connection of an operational unit associated with the third number to the telephone line; if the third ring is not equal to T-2, noting an error and resetting the system.

* * * * *